March 31, 1959  A. G. MASINDA  2,879,599
LOCATOR PIN
Filed Oct. 31, 1955

INVENTOR.
ALBERT G. MASINDA
BY
Robert A. Sloman
ATTORNEY

United States Patent Office 2,879,599
Patented Mar. 31, 1959

2,879,599

LOCATOR PIN

Albert G. Masinda, Detroit, Mich., assignor to IBC Products, Inc., Detroit, Mich., a corporation of Michigan Application October 31, 1955, Serial No. 543,903

7 Claims. (Cl. 33—125)

This invention relates to locator pins and more particularly to their use in combination with a measuring bar upon a machine tool for providing an automatic locating means between a movable portion of the machine and a stationary portion of the machine.

Heretofore, locator bars have been employed upon the carriage, for example, of a machine tool, which bars have a series of longitudinally spaced transverse apertures therethrough in predetermined spaced relation depending upon the particular machining operation for a particular job. Locator pins have heretofore been employed in conjunction with such bar. However, it has often been found difficult to accurately locate the transverse openings in the bar for eliminating errors. This consequently results in a slight error in the final spacing or location of the particular machining with respect to the workpiece such as the drilling of a hole therethrough.

It is the primary object of the present invention to provide a locator pin construction which will correct this error and will eliminate error.

It is the further object of the present invention to provide in a measuring bar construction of this type a novel form of eccentric bushing which is rotatably adjustable within the transverse openings formed through the bar and is adapted to be secured in the finally rotated position to thereby accurately set the spacing of any side of a locator pin projected through said bushing with respect to an indicator, or with respect to a measuring block or blocks or a micrometer which may be interposed between the measuring edge of the locator pin and of the gaging mechanism.

It is the still further object of the present invention to employ in conjunction with such measuring bar the present eccentric bushing which may be rotatively adjusted within the said bar and secured in rotated position so that a plurality of said bushings may be pre-set angularly within said bar, and whereby the locator pin may be selectively positioned within any or all of the said pre-adjusted eccentric bushings. This will assure that the predetermined spacing established by rotation of said eccentric bushings will remain the same and the said locator pin may be selectively introduced within any of the said adjusted eccentric bushings, with the assurance that the said locator pin will correctly register with the predetermined location as set.

These and other object will be seen from the following specification and claims in conjunction with the appended drawing, in which:

It will be understood that the above drawing illustrates merely a preferred embodiment of the invention and that other embodiments are contemplated within the scope of the claims hereafter set forth.

Figure 1:
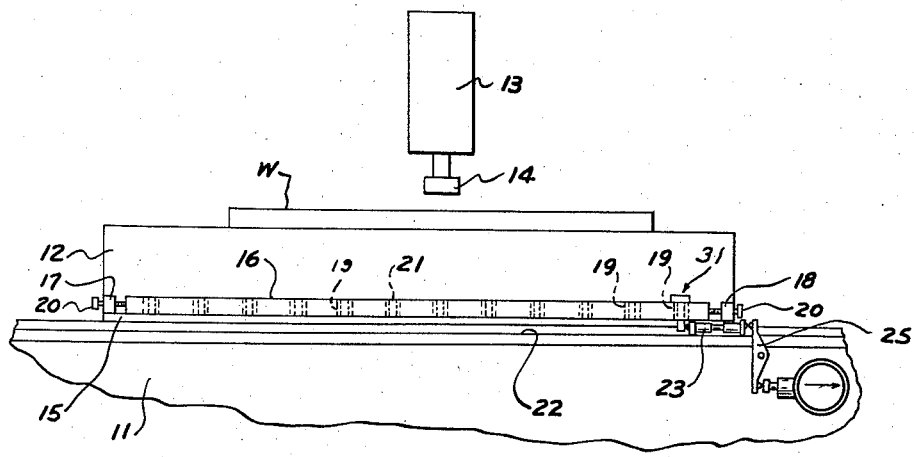
Fig. 1 is a front elevational and partially diagrammatic view of a machine tool, incorporating the present locator pin and bar and the gaging mechanism employed.

Referring to Fig. 1, the present machine tool includes a stationary element or base 11, upon which is provisioned in a conventional manner a longitudinally reciprocal carriage 12 upon which is mounted and secured workpiece W with respect to an overlying spindle 13 which forms a part of the machine and which has a depending tool 14 whose longitudinal axis in a conventional manner is arranged at right angles to the direction of adjustment of carriage 12.

Carriage 12 in the preferred embodiment has a longitudinal ledge or support 15 forming a part thereof upon which is positioned the measuring bar 16 and which has formed transversely therethrough a series of circular slots 21, and which are formed in a predetermined spaced relation with respect to each other.

Opposed projections 17 and 18 on carriage 12 are arranged adjacent opposite ends of measuring bar 16 and have longitudinally threaded therethrough in opposed relation the axially aligned adjusting bolts 20. These bolts threadedly engage the projections 17 and 18 and are adapted to operatively engage the opposite end wall portions of the measuring bar 16 in order to provide a predetermined yet adjustable location of said bar upon and with respect to carriage 12.

There is also provided upon the bed 11 of the machine a horizontally disposed trough or ledge 22 within which may be positioned a measuring block or, for illustration, the micrometer 23, and which is adapted to rest in a horizontal position as shown.

There is incorporated as a portion of the machine a gaging element which includes the lever 25 pivotally mounted at 26 upon bed 11 and which at one end as at 24 engages the right end of micrometer 23. The opposite end of said micrometer is adapted to operatively be engaged by the lower end 34 of the locator pin 31 carried by measuring bar 16 as the carriage 12 is manually or otherwise fed with respect to the bed 11 for locating the workpiece W with respect to the tool 14.

The lower end of the lever as at 27 is adapted to operatively engage the reciprocal spindle 28 on the dial indicator 29 whose pointer 30 is adapted to register zero at the moment that the locator pin 31 operatively engages the micrometer 23 to indicate that for the particular positioning of the locator pin 31 the cutting tool 14 will be in correct registry with the workpiece in accordance with a predetermined pattern or blue print which has determined in advance the exact location of the openings or other machining to be done in the workpiece.

Figure 2:
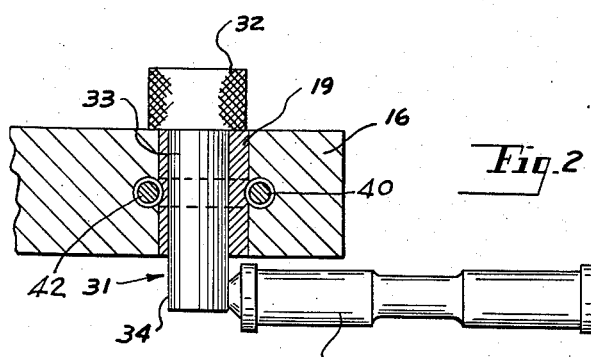
Fig. 2 is a fragmentary elevational view partially sectioned illustrating one of said locator pins with eccentric bushing and a portion of the measuring bar in conjunction with a micrometer and a gage element, shown on an enlarged scale.
Figure 3:
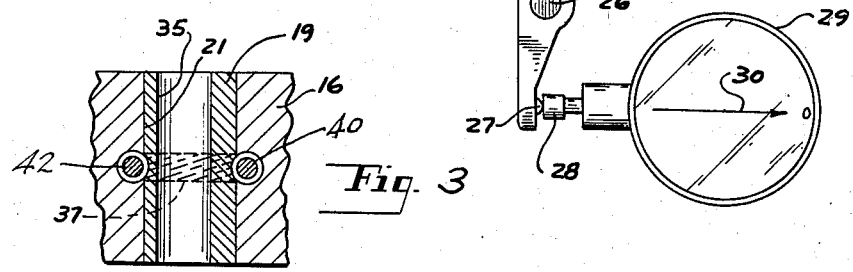
Fig. 3 is a side elevational section of the eccentric bushing shown in Fig. 2 on an enlarged scale with the bar partially broken away and sectioned.
Figure 4:
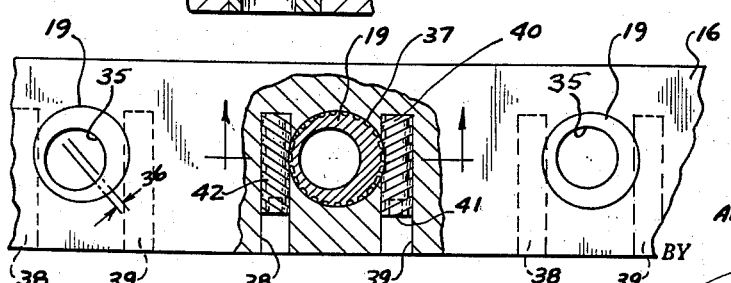
Fig. 4 is a fragmentary plan view partially broken away and sectioned illustrating a portion of the measuring bar with eccentric bushings nested within transverse apertures therethrough, and operating means for effecting rotary adjustment of a particular bushing.

The locator pin receiving eccentric bushing 19, in conjunction with the measuring bar 16, is more particularly illustrated on an enlarged scale with respect to Figs. 2, 3 and 4.

As shown in Fig. 2, the locator pin 31 includes the knurled head 32 upon one end of the cylindrical shank 33 which forms a part of the pin and which is of reduced diameter with respect to the head 32. The shank 33 is slidably and snugly positioned within the transverse aperture 35 of bushing 19 and there is a reasonably close fit between the said bushing and pin.

As each of the said eccentric bushings are to be rotatably adjusted within the said apertures 21 in the measuring bar 16, while this may be done manually, in the present preferred embodiment of the present invention mechanical means are employed for this purpose.

Referring to Figs. 3 and 4, there is formed within the contour of bushing 19 intermediate its ends a continuous worm 37. Transversely thereof and extending into the measuring bar at right angles to the height of apertures 21 are a series of pairs of transverse cylindrical or blind slots 38 and 39 arranged intermediate the height of the said measuring bar and adapted for communication with the interior of the said apertures 21.

A pair of worm gears 40 and 42 with socket heads 41, for illustration, are loosely and rotatively nested within the said slots 38 and 39 and are adapted for and do mesh with the worm 37. In order to rotatively adjust the said bushing, one of the said worm gears, such as gear 42, will be loosened. The other worm gear 40 will be manually rotated to thereby effect a rotary adjustment of bushing 19 until said bushing has been correctly angularly adjusted. Thereafter, the second worm gear 42 will be rotated with respect to worm 37 acting as a set screw to thereby lock the said worm and the related bushing in the correct or predetermined position of rotary adjustment. Accordingly, it follows that for each of the transverse apertures 21 formed in measuring bar 16 there may be rotatively positioned and pre-set a particular eccentric bushing. Thus, any locator pin 31—32 may be employed and may be projected within the said eccentric bushing 19.

The shank 33 of pin 31 extends through bushing 19 with the head 32 resting upon said bushing or adjacent portions of measuring bar 16, with the lower end portion 34 of said pin adapted to engage one end of micrometer 23, as shown in Fig. 2. As indicated in Fig. 4, numeral 36 designates the extent of the offset of the center line of the eccentric aperture with respect to the central axis of the bushing body. This offset is slightly larger than one-half of the greatest error in any two adjacent holes in the measuring bar.

Accordingly, though great effort is usually made in effecting an accurate spacing of the holes 21 in bar 16, almost always there will be some slight error in the spacing which will preclude a completely accurate predetermined location of the workpiece with respect to the cutting tool. Accordingly, it is contemplated as a part of the present invention that the eccentric bushing 19 may be manually rotated so that its eccentrically arranged aperture 35 will in effect be laterally translated with the pin 31 positioned therein. Accordingly, there will be a corresponding lateral translation of the said pin 31 so as to operatively engage micrometer 23 whose opposite end is in contact with the measuring gage, including the dial indicator or other measuring gage mechanism. Consequently, the eccentric bushing 19 with the pin 31 therein may be rotated until the exact correction has been made in the measurement, after which the said eccentric bushing may be locked in this position of rotation as, for example, by the second worm gear 42 which acts as a set screw.

This means that, after the locating pin 31 is removed from a particular bushing 19 and transferred to a different bushing, such as in accomplishing a second machining operation of a particular workpiece, or other machining operations, if the pin is replaced in the initial opening 35 of the first bushing, there is assurance that the locating pin has again arrived at the same position which was originally determined.

In the construction of the measuring bar 16 it is, therefore, a part of the present invention that the said eccentric bushings will be introduced one at a time into their respective predetermined holes 21, and in each case manually or otherwise rotated until the edge of the locator pin 31 positioned within said bushing is in registry with a micrometer or other gage block and in conjunction with a gaging mechanism for achieving the correct accurate spacing for the next machining operation.

By this process each of the separate bushings 19 may be rotatively adjusted within its particular aperture 21 and secured in the correct position of adjustment. Thereafter the locator pin 31 may be switched at will from one bushing to the other.

By this construction it is possible to accurately machine a plurality of identical workpieces, one at a time. With the present locator pin and bushing, and when the gage indicator 29 registers zero with respect to a particular location, the operator knows that the same predetermined relationship between the cutting tool 14 and the particular workpiece will be established. This applies for all workpieces without re-measuring or re-locating the machine slide with respect to the bed 11.

It is contemplated as a part of the present invention that the parts be reversed to the extent that the measuring mechanism may be mounted upon the movable part of the machine, whereas, the measuring bar may be mounted upon the stationary portion of the machine.

In the preferred embodiment of the invention the apertures 21, i.e., the spacing of the apertures 21, corresponds to the desired machining operation, which, of course, is predetermined by the blue print or other plan for machining of the workpiece. On the other hand, employing a measuring bar such as shown in Fig. 1, it is possible to establish a predetermined spacing between the respective apertures 21 and to accurately set the location of the locator pin 31, so as to eliminate all error in the location of the openings 21 in the measuring bar.

In the machine measurements system hereinabove described, hole increment spacing is obtained through the registry of the side of the pin to the indicator. Decimal increments are obtained by adjustment of the micrometer.

This method of measurement may also be used without micrometers when hole spacings in the measuring bar are bored to dimensions required by one certain job. In this case the pin registers directly against the indicator.

In modern shop practice, the spacing of holes in a measuring bar of this type to extremely fine tolerances is oftentimes hard to do, and in all cases very costly. The present invention thus contemplates a locator pin and eccentric bushing which has been devised to correct or compensate for such errors in hole spacings, thus making it possible to produce measuring bars of this nature with great ease and at minimum cost. Such bars provide a very effective means of obtaining fast and relatively accurate machine movements.

Having described my invention, reference should now be had to the claims which follow for determining the scope thereof.

I claim:

1. In combination an elongated measuring bar adapted for positioning upon one of two relatively movable parts of a machine tool, said bar having formed therethrough a series of cylindrical apertures in predetermined longitudinally spaced relation, an eccentric bushing rotatively positioned and secured within each aperture whereby the central axes of the bushing openings may be translated longitudinally of said bar to predetermined accurate locations, and a locator pin selectively positionable within any of said bushings, said pin including an enlarged head supported upon said bushing and bar and a cylindrical body slidably positioned within said bushing and depending below said bar adapted for lateral engagement with an indicating means mounted upon the other of said relatively movable parts.

2. In combination an elongated measuring bar, said bar having formed therethrough a series of cylindrical apertures in predetermined longitudinally spaced relation, an eccentric bushing rotatively positioned and secured within each aperture whereby the central axes of the bushing openings may be translated longitudinally of said bar to predetermined accurate locations, and a locator pin selectively positionable within any of said bushings, said pin including an enlarged head supported upon said bushing and bar and a cylindrical body slidably positioned within said bushing and depending below said bar.

3. The combination of claim 1, cooperating means on said bushing and within said bar for effecting rotary movements of said bushing with respect to said bar.

4. The combination of claim 1, cooperating means on said bushing and within said bar for effecting rotary movements of said bushing with respect to said bar, and means on said bar cooperable with said bushing for locking said bushing in adjusted position.

5. The combination of claim 2, cooperating means on said bushing and within said bar for effecting rotary movements of said bushing with respect to said bar, and means on said bar cooperable with said bushing in adjusted position.

6. The combination of claim 1, a worm formed upon said bushing within the outline thereof intermediate its ends, there being a transverse slot formed in said measuring bar substantially tangent to the bushing aperture, and a manually rotatable worm gear within said slot in mesh with said worm for effecting rotary adjustments of said bushing.

7. The combination of claim 1, a worm formed upon said bushing within the outline thereof intermediate its ends, there being a transverse slot formed in said measuring bar substantially tangent to the bushing aperture, a manually rotatable worm gear within said slot in mesh with said worm for effecting rotary adjustments of said bushing, there being a second slot formed within said bar upon the opposite side of said bushing substantially tangent to the bushing aperture, and a second worm gear rotatively positioned within said latter slot operatively engageable with said worm to permit locking of said bushing in adjusted position.

References Cited in the file of this patent

UNITED STATES PATENTS

| | | |
|---|---|---|
| 2,028,134 | Brubaker | Jan. 21, 1936 |
| 2,575,945 | De Vlieg | Nov. 20, 1951 |
| 2,711,935 | Miles | June 28, 1955 |